United States Patent
Edwards et al.

(10) Patent No.: US 10,264,292 B1
(45) Date of Patent: Apr. 16, 2019

(54) ELECTRONIC PROGRAM GUIDE PROVISIONING IN REAL-TIME

(71) Applicant: Disney Enterprises, Inc., Burbank, CA (US)

(72) Inventors: Jon M. Edwards, Anaheim, CA (US); Shant H. Mardigian, La Crescenta, CA (US); Han Kim, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/914,847

(22) Filed: Mar. 7, 2018

(51) Int. Cl.
```
G06F 3/00       (2006.01)
G06F 13/00      (2006.01)
H04N 5/445      (2011.01)
H04N 21/231     (2011.01)
H04N 21/84      (2011.01)
H04L 29/06      (2006.01)
```

(52) U.S. Cl.
CPC ..... *H04N 21/23109* (2013.01); *H04L 65/602* (2013.01); *H04N 21/84* (2013.01)

(58) Field of Classification Search
CPC . H04N 21/23109; H04N 21/84; H04L 65/602
USPC .......................................... 725/46, 39, 44, 50
See application file for complete search history.

(56) References Cited

U.S. PATENT DOCUMENTS 9,992,540 B2 * 6/2018 Casey .............. H04N 21/26283

* cited by examiner

*Primary Examiner* — Nnenna N Ekpo
(74) *Attorney, Agent, or Firm* — Farjami & Farjami LLP

(57) ABSTRACT

There is provided an electronic program guide (EPG) provisioning system that receives traffic data for programming content included in a programming content stream, extracts programming content metadata describing the programming content from the traffic data, and obtains supplemental metadata further describing the programming content. The EPG system further enriches the programming content metadata using the supplemental metadata to produce an enhanced programming content metadata, conforms the enhanced programming content metadata to each of multiple formats corresponding respectively to EPG providers for the programming content stream, and then distributes the enhanced programming content metadata to the EPG providers in real-time with respect to receiving the traffic data.

17 Claims, 3 Drawing Sheets

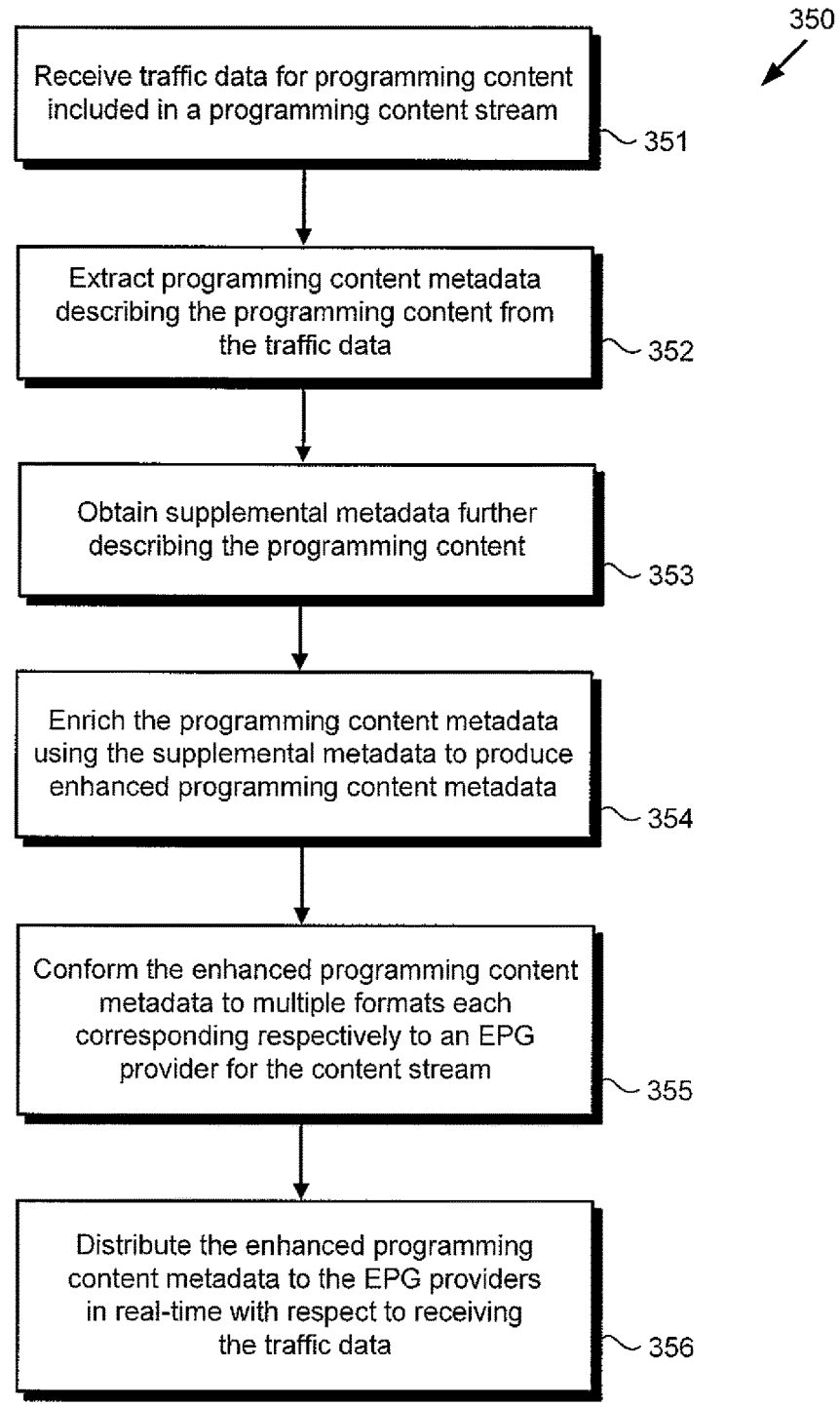

ELECTRONIC PROGRAM GUIDE PROVISIONING IN REAL-TIME

BACKGROUND

As the systems designed to deliver television (TV) programming content to viewers migrate to modern communication networks such as the Internet, processes for distributing electronic program guide (EPG) data that were developed for use in a traditional broadcast environment may continue to be relied upon. Unfortunately, however, those conventional processes typically require the distribution of read-only documents including EPG data to multiple systems, and further require manual entry of the EPG data into those systems. Due to their reliance on manual data entry into multiple systems, conventional processes for distributing EPG data are often prone to errors. Consequently, the EPGs that are produced based on EPG data distributed in the conventional manner may not be reliable sources of programming information for viewers.

SUMMARY

There are provided systems and methods for performing electronic program guide (EPG) provisioning in real-time, substantially as shown in and/or described in connection with at least one of the figures, and as set forth more completely in the claims.

BRIEF DESCRIPTION OF THE DRAWINGS

FIG. 3 shows a flowchart presenting an exemplary method for performing EPG provisioning, according to one implementation.

DETAILED DESCRIPTION

Figure 1:
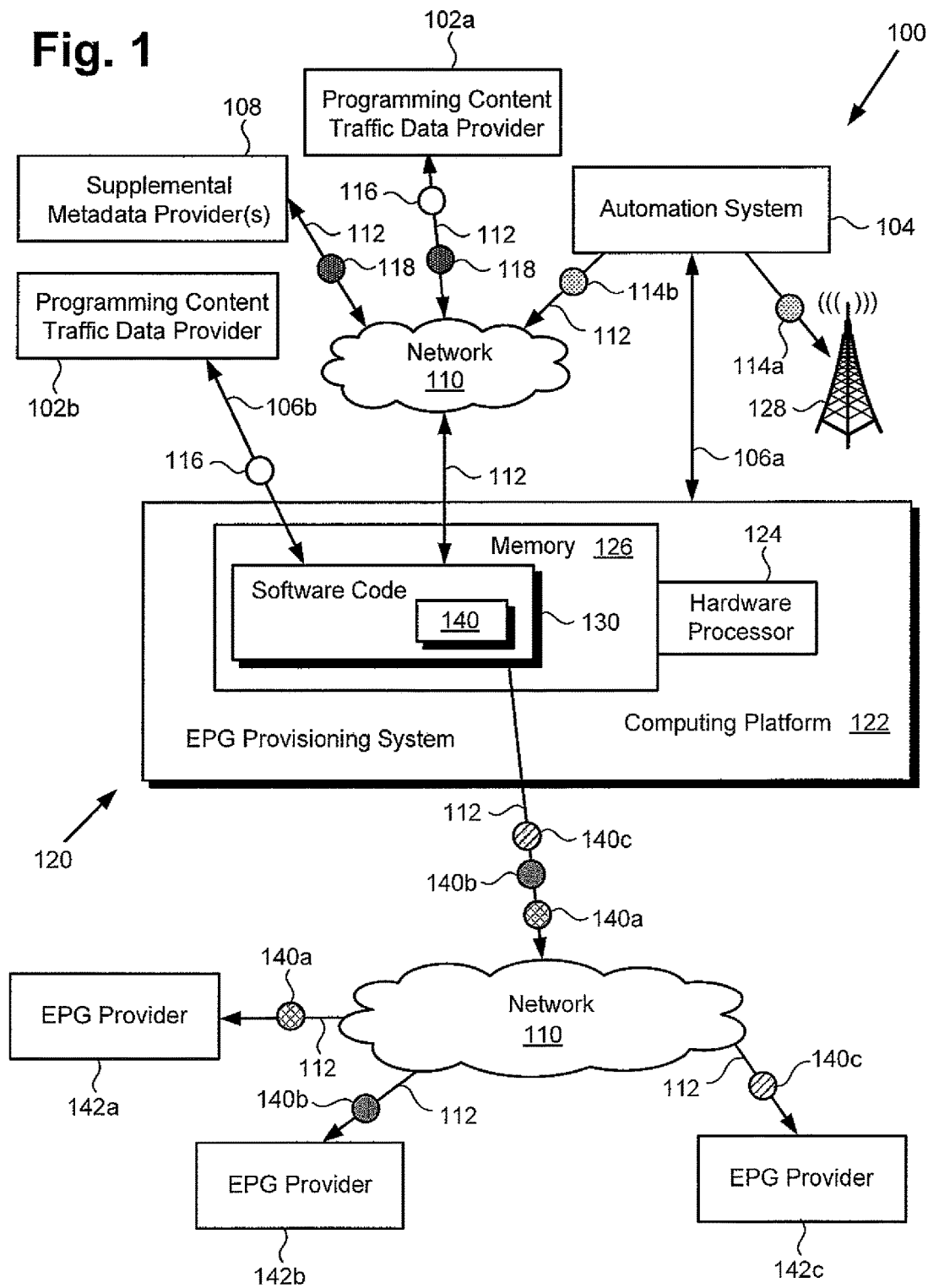
FIG. 1 shows a diagram of an exemplary electronic program guide (EPG) provisioning system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing EPG provisioning that address and overcome the deficiencies in the conventional art. By utilizing traffic data for programming content included in a programming content stream as the source of programming content metadata, the present solution advantageously automates the process of real-time metadata aggregation. In addition, by enriching that programming content metadata with supplemental metadata available from a variety of sources, the present solution produces enhanced programming content metadata including more descriptive information than is conventionally provided to viewers of linear TV content. Moreover, by conforming the enhanced programming content metadata to the respective formats utilized by EPG providers, and distributing the conformed and enhanced programming content metadata to those EPG providers in real-time with respect to receiving the traffic data, the present solution advantageously enables EPG provisioning in real-time.

FIG. 1 shows a diagram of exemplary EPG provisioning system 120, according to one implementation. As shown in FIG. 1, EPG provisioning system 120 is implemented in programming content distribution environment 100 including programming content traffic data providers 102a and 102b, and one or more supplemental metadata provider(s) 108, and communication network 110 having network communication links 112. In addition, programming content distribution environment 100 includes automation system 104 providing programming content streams 114a and 114b, TV broadcasting platform 128, communication links 106a and 106b that may be independent of communication network 110, and EPG providers 142a, 142b, and 142c for programming content streams 114a and 114b. Also shown in FIG. 1 are traffic data 116, supplemental metadata 118, and enhanced programming content metadata 140, as well as conformed and enhanced programming content metadata 140a, 140b, and 140c corresponding to enhanced programming content metadata 140.

EPG provisioning system 120 includes computing platform 122 having hardware processor 124 and system memory 126 implemented as a non-transitory storage device. According to the present exemplary implementation, system memory 126 stores software code 130 configured to distribute enhanced programming content metadata 140 to EPG providers 142a, 142b, and 142c in real-time with respect to receiving traffic data 116 from programming content traffic data providers 102a and/or 102b.

It is noted that enhanced programming content metadata 140 is conformed to formats utilized respectively by EPG providers 142a, 142b, and 142c prior to distribution to EPG providers 142a, 142b, and 142c. Consequently, enhanced programming content metadata 140 is distributed to EPG provider 142a as conformed an enhanced programming content metadata 140a. Enhanced programming content metadata 140 is analogously distributed to EPG providers 142b and 142c as respective conformed and enhanced programming content metadata 140b and 140c.

In some implementations, computing platform 122 of EPG provisioning system 120 may correspond to one or more web servers, accessible over a packet-switched network such as the Internet, for example. Alternatively, computing platform 122 of EPG provisioning system 120 may correspond to one or more computer servers supporting a private local area network (LAN), private wide area network (WAN), or included in another type of limited distribution network. That is to say, in some implementations, communication network 110 may include a public network such as the Internet, while in some implementations communication network 110 may include a private LAN, WAN, or other limited distribution network.

It is noted that, although the present application refers to software code 130 as being stored in system memory 126 for conceptual clarity, more generally, system memory 126 may take the form of any computer-readable non-transitory storage medium. The expression "computer-readable non-transitory storage medium," as used in the present application, refers to any medium, excluding a carrier wave or other transitory signal that provides instructions to hardware processor 124 of computing platform 122. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to some implementations, EPG provisioning system 120 may be integrated with automation system 104 so as to function as a feature of automation system 104. For example, automation system 104 may be a cloud based and substantially automated system for distributing programming content stream 104a over TV broadcast platform 128 and/or programming content stream 104b over communication network 110.

In one implementation, automation system 104 may be programming content distribution resource owned or utilized by a media entity providing TV content as programming content streams 114a and/or 114b. Programming content stream 104a may be a linear TV broadcast stream, for example, including an ultra-high-definition (ultra HD), HD, or standard-definition (SD) baseband video signal with embedded audio, captions, time code, and other ancillary metadata, such as ratings and/or parental guidelines. In some implementations, programming content stream 104a may include multiple audio tracks, and may utilize secondary audio programming (SAP) and/or Descriptive Video Service (DVS), for example. Programming content stream 104a may be broadcast to a traditional TV audience using TV broadcasting platform 128, which may include a conventional cable and/or satellite network, for example.

In addition, and as depicted in FIG. 1, in some implementations it may be advantageous or desirable to make some or all of the programming content included in programming content stream 104a available via an alternative distribution channel, such as communication network 110. Consequently, in some implementations, programming content stream 114b including TV programming content may be provided as an Internet Protocol (IP) content stream distributed over the Internet.

Figure 2:
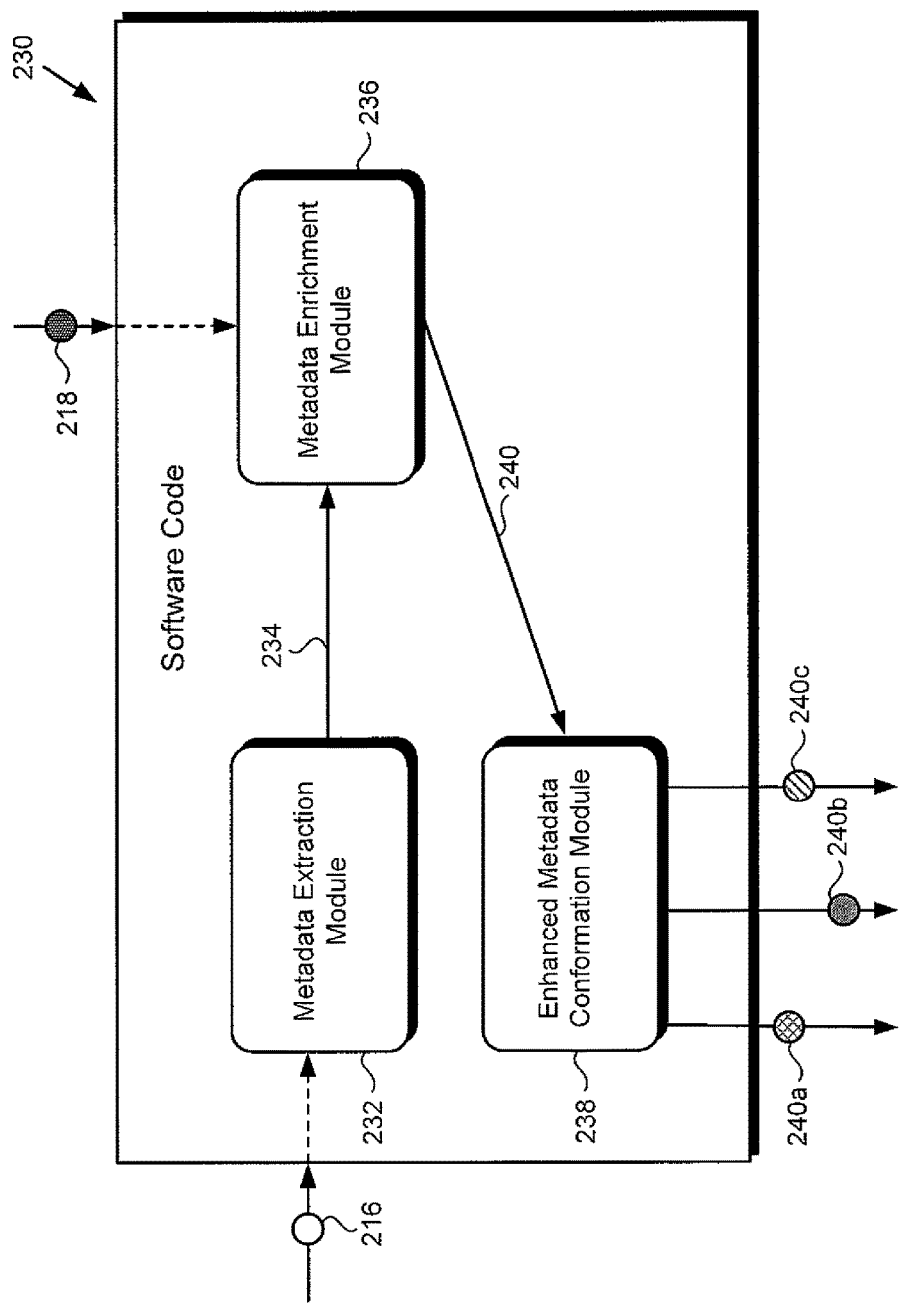
FIG. 2 shows a diagram of an exemplary software code suitable for use by an EPG provisioning system, according to one implementation.

FIG. 2 shows a more detailed diagram of software code 230 suitable for use by EPG provisioning system 120, in FIG. 1, according to one exemplary implementation. As shown in FIG. 2, software code 230 may receive traffic data 216 and supplemental metadata 218 as inputs. In addition, software code 230 may selectively distribute conformed and enhanced programming content metadata 240a, 240b, and 240c to EPG providers corresponding respectively to EPG providers 142a, 142b, and 142c in FIG. 1, as outputs. As further shown in FIG. 2, software code 230 includes metadata extraction module 232, metadata enrichment module 236, and enhanced metadata conformation module 238. Also shown in FIG. 2 are programming content metadata 234 extracted from traffic data 216 and enhanced programming content metadata 240 produced through enrichment of programming content metadata 234 using supplemental metadata 218.

Software code 230 including metadata extraction module 232, metadata enrichment module 236, and enhanced metadata conformation module 238 corresponds in general to software code 130, in FIG. 1, and those corresponding features may share any of the characteristics attributed to either corresponding feature by the present disclosure. That is to say, although not shown in FIG. 1, software code 130 may include features corresponding to metadata extraction module 232, metadata enrichment module 236, and enhanced metadata conformation module 238.

Traffic data 216, in FIG. 2, corresponds in general to traffic data 116, in FIG. 1, and those corresponding features may share any of the characteristics attributed to either corresponding feature by the present disclosure. Moreover, enhanced programming content metadata 240, and conformed and enhanced programming content metadata 240a, 240b, and 240c correspond respectively in general to enhanced programming content metadata 140, and conformed and enhanced programming content metadata 140a, 140b, and 140c, and those corresponding features may share any of the characteristics attributed to either corresponding feature by the present disclosure.

The functionality of software code 130/230 will be further described by reference to FIG. 3 in combination with FIGS. 1 and 2. FIG. 3 shows flowchart 350 presenting an exemplary method for performing EPG provisioning, according to one implementation. With respect to the method outlined in FIG. 3, it is noted that certain details and features have been left out of flowchart 350 in order not to obscure the discussion of the inventive features in the present application.

Referring to FIG. 3 in combination with FIGS. 1 and 2, flowchart 350 begins with receiving traffic data 116/216 for programming content included in programming content stream 114a and/or 114b (action 351). Traffic data 116/216 may include scheduling information for the programming content included in programming content stream 114a and/or 114b for a predetermined time interval. For example, traffic data 116/216 may be received from programming content traffic data providers 102a and 102b on a regularly scheduled basis every twenty-four hours, and may include the programming schedule for programming content stream 114a and/or 114b for that twenty-four hour interval.

In some implementations, traffic data 116/216 may be received on an unscheduled basis as changes to the programming schedule are identified by programming content traffic data providers 102a and 102b. For example, traffic data 116/216 may include dynamic updates for live broadcast content, or in the event that regularly scheduled programming content is unavailable or has been rescheduled. Traffic data 116/216 for the programming content included in programming content stream 114a and/or 114b may be received by software code 130/230, executed by hardware processor 124.

As shown in FIG. 1, software code 130/230 of EPG provisioning system 120 may receive traffic data 116/216 in a number of different ways. In some instances, for example, software code 130/230 may receive traffic data 116/216 from programming content traffic data provider 102a via communication network 110 and network communication links 112. Alternatively, or in addition, in some instances, software code 130/230 may receive traffic data 116/216 from programming content traffic data provider 102b via communication link 106b independent of communication network 110. That is to say, in some implementations, EPG provisioning system 120 may be in direct communication with one or more programming content traffic data providers 102a and 102b.

Flowchart 350 continues with extracting programming content metadata 234 describing the programming content included in programming content stream 114a and/or 114b from traffic data 116/216 (action 352). As noted above, traffic data 116/216 may include scheduling information for the programming content included in programming content stream 114a and/or 114b for a predetermined time interval, such as twenty-four hours. As part of that scheduling information, traffic data 116/216 may include programming content metadata 234 at least identifying the individual programming content elements included in a playlist of programming content stream 114a and/or 114b.

In addition to identification data for the programming content elements included in programming content stream 114a and/or 114b, such as the titles of specific television programs and/or series, programming content metadata 234 may include other sparse metadata. For example, programming content metadata 234 may include the time duration of each programming content element, its parental rating, and/or its source, for example. Extraction of programming content metadata 234 from traffic data 116/216 may be performed by software code 130/230, executed by hardware processor 124, and using metadata extraction module 232.

Flowchart 350 continues with obtaining supplemental metadata 118/218 further describing the programming content included in programming content stream 114a and/or 114b (action 353). Supplemental metadata 118/218 may be obtained by software code 130/230, executed by hardware processor 124, from one or more of a number of different resources. For example, in some implementations, programming content traffic data providers 102a and 102b may possess more and/or richer metadata describing the programming content included in programming content stream 114a and/or 114b than is included in traffic data 116/216. In those implementations, supplemental metadata 118/218 may be obtained from one or more of programming content traffic data providers 102a and 102b, for example, in response to queries issued by software code 130/230.

Alternatively, or in addition, supplemental metadata 118/218 may be obtained from supplemental metadata provider(s) 108 other than programming content traffic data providers 102a and 102b. For example, as noted above, in some implementations, programming content metadata 234 may identify the respective sources of the programming content elements included in programming content stream 114a and/or 114b. In those implementations, supplemental metadata 118/218 may be obtained from those respective programming content element sources.

Moreover, in some implementations, hardware processor 124 may be configured to execute software code 130/230 to perform a search for trustworthy sources of supplemental metadata 118/218 via communication network 110. For example, hardware processor 124 may execute software code 130/230 to perform a web search for Internet sources of supplemental metadata 118/218 based on identification of the programming content elements included in programming content stream 114a and/or 114b. In those implementations, software code 130/230 may obtain supplemental metadata 118/218 from an Internet source identified as an authorized or otherwise trusted source of supplemental metadata 118/218.

Flowchart 350 continues with enriching programming content metadata 234 using and including supplemental metadata 118/218 to produce enhanced programming content metadata 140/240 (action 354). Supplemental metadata 118/218 may include more and/or richer metadata describing the programming content included in programming content stream 114a and/or 114b than programming content metadata 234. For example, while programming content metadata 234 may include the time duration of each programming content element of programming content stream 114a and/or 114b, its parental rating, and/or its source, supplemental metadata 118/218 may include richer information.

As a specific example, supplemental metadata 118/218 may include a synopsis of the programming content element, a credits list associating characters appearing in the programming content element with the actors portraying them, and/or whether the programming content element is a live program or a non-live program. Alternatively, or in addition, supplemental metadata 118/218 may identify the language spoken in the primary audio program of the programming content element, as well as the availability of one or more secondary audio programs in other languages.

Enrichment of programming content metadata 234 by using and including supplemental metadata 118/218 results in production of enhanced programming content metadata 140/240 including all of programming content metadata 234 and any or all of supplemental metadata 118/218. Enrichment of programming content metadata 234 using supplemental metadata 118/218 to produce enhanced programming content metadata 140/240 may be performed by software code 130/230, executed by hardware processor 124, and using metadata enrichment module 236.

Flowchart 350 continues with conforming enhanced programming content metadata 140/240 to multiple formats each corresponding respectively to one of EPG providers 142a, 142b, and 142c (action 355). Programming content metadata 234 and supplemental metadata 118/218 may be received and/or may be processed by software code 130/230 as metadata in Broadcast Exchange Format (BXF) or another Extensible Markup Language (XML) based format. However, in some implementations, each of EPG providers 142a, 142b, and 142c may require that metadata describing programming content included in their respective EPGs be distributed to them in a particular Society of Cable Telecommunications Engineers (SCTE) 224 compliant format. Moreover, each of EPG providers 142a, 142b, and 142c may utilize a different SCTE 224 compliant format.

Thus, conforming enhanced programming content metadata 140/240 may include translating enhanced programming content metadata 140/240 from one of BXF or another XML based format to an SCTE 224 compliant format. Conformation of enhanced programming content metadata 140/240 may be performed by software code 130/230, executed by hardware processor 124, and using enhanced metadata conformation module 238. Action 355 results in generation of conformed and enhanced programming content metadata 140a/240a, 140b/240b, and 140c/240c.

Flowchart 350 can conclude with distributing conformed and enhanced programming content metadata 140a/240a, 140b/240b, and 140c/240c to respective EPG providers 142a, 142b, and 142c in real-time with respect to receiving traffic data 116/216 (action 356). Distribution of conformed and enhanced programming content metadata 140a/240a, 140b/240b, and 140c/240c to respective EPG providers 142a, 142b, and 142c may be performed by software code 130/230, executed by hardware processor 124.

As shown in FIG. 1, conformed and enhanced programming content metadata 140a/240a, 140b/240b, and 140c/240c may be distributed to respective EPG providers 142a, 142b, and 142c via communication network 110. Regarding real-time distribution of conformed and enhanced programming content metadata 140a/240a, 140b/240b, and 140c/240c to respective EPG providers 142a, 142b, and 142c, it is noted that in some implementations, conformed and enhanced programming content metadata 140a/240a, 140b/240b, and 140c/240c may be distributed to respective EPG providers 142a, 142b, and 142c by software code 130/230 within a few seconds of receiving traffic data 116/216 in action 351.

As noted above, in some implementations, traffic data 116/216 may be received from programming content traffic data providers 102a and 102b on a regularly scheduled basis, such as every twenty-four hours, and may include the programming schedule for content stream 114a and/or 114b for that twenty-four hour interval. In those implementations, conformed and enhanced programming content metadata 140a/240a, 140b/240b, and 140c/240c distributed to respective EPG providers 142a, 142b, and 142c in action 356 may result in provisioning of the EPGs provided by EPG providers 142a, 142b, and 142c for substantially the entire twenty-four hour interval.

However, in some implementations, updates to traffic data 1161216 may be received on an unscheduled basis from programming content traffic data providers 102a and/or 102b as changes to the programming schedule are identified by programming content traffic data providers 102a and/or 102b. For example, updates for traffic data 116/216 may include dynamic updates for live broadcast content, or in the event that regularly scheduled programming content is unavailable or has been rescheduled.

In implementations in which updates to traffic data 116/216 are provided, hardware processor 124 may be further configured to execute software code 130/230 to receive the update to traffic data 116/216, extract programming content metadata 234 from the update, and obtain supplemental metadata 118/218 corresponding to the update. In addition, hardware processor 124 may execute software code 1301230 to enrich programming content metadata 234 extracted from the update using supplemental metadata 118/218 corresponding to the update to produce enhanced programming content metadata 140/240 corresponding to the update. Hardware processor may also execute software code 130/230 to conform enhanced programming content metadata 140/240 corresponding to the update to the formats used by EPG providers 142a, 142b, and 142c, as well as to distribute conformed and enhanced programming content metadata 140a/240a, 140b/240b, 140c/240c corresponding to the update to respective EPG providers 142a, 142b, and 142c in real-time with respect to receiving the update, e.g., within a few seconds of receiving the update.

Thus, the present application discloses systems and methods for performing EPG provisioning in real-time. By utilizing traffic data for programming content included in a programming content stream as the source of programming content metadata, the present solution advantageously automates the process of real-time metadata aggregation. In addition, by enriching that programming content metadata with supplemental metadata available from a variety of sources, the present solution produces enhanced programming content metadata including more descriptive information than is conventionally provided to viewers of linear TV content. Moreover, by conforming the enhanced programming content metadata to the respective formats utilized by EPG providers, and distributing the conformed and enhanced programming content metadata to those EPG providers in real-time with respect to receiving the traffic data, the present solution advantageously enables EPG provisioning in real-time.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An electronic program guide (EPG) provisioning system comprising:
   a computing platform including a hardware processor and a system memory storing a software code;
   the hardware processor configured to execute the software code to:
      receive a traffic data for a programming content included in a programming content stream;
      extract a programming content metadata describing the programming content from the traffic data;
      obtain a supplemental metadata further describing the programming content;
      enrich the programming content metadata using the supplemental metadata to produce an enhanced programming content metadata;
      conform the enhanced programming content metadata to each of a plurality of formats corresponding respectively to a plurality of EPG providers for the programming content stream, wherein conforming is performed by translating the enhanced programming content metadata from a Broadcast Exchange Format (BXF) or another Extensible Markup Language (XML) based format to an SCTE 224 compliant format; and
      distribute the enhanced programming content metadata to the plurality of EPG providers in real-time with respect to receiving the traffic data.

2. The EPG provisioning system of claim 1, wherein the programming content stream comprises a linear television broadcast stream.

3. The EPG provisioning system of claim 1, wherein the programming content stream comprises an Internet Protocol (IP) content stream.

4. The EPG provisioning system of claim 1, wherein the programming content comprises live broadcast content.

5. The EPG provisioning system of claim 1, wherein the supplemental metadata is obtained from a provider of the traffic data.

6. The EPG provisioning system of claim 1, wherein the hardware processor is further configured to execute the software code to:
   receive an update to the traffic data;
   extract a programming content metadata from the update;
   obtain a supplemental metadata corresponding to the update;
   enrich the programming content metadata extracted from the update using the supplemental metadata corresponding to the update to produce an enhanced programming content metadata corresponding to the update;
   conform the enhanced programming content metadata corresponding to the update to each of the plurality of formats corresponding respectively to the plurality of EPG providers; and
   distribute the enhanced programming content metadata corresponding to the update to the plurality of EPG providers in real-time with respect to receiving the update.

7. A method for use by an electronic program guide (EPG) provisioning system including a computing platform having a hardware processor and a system memory storing a software code, the method comprising:

receiving, using the hardware processor, a traffic data for a programming content included in a programming content stream;

extracting, using the hardware processor, a programming content metadata describing the programming content from the traffic data;

obtaining, using the hardware processor, a supplemental metadata further describing the programming content;

enriching, using the hardware processor, the programming content metadata using the supplemental metadata to produce an enhanced programming content metadata;

conforming, using the hardware processor, the enhanced programming content metadata to each of a plurality of formats corresponding respectively to a plurality of EPG providers for the programming content stream, wherein the conforming is performed by translating the enhanced programming content metadata from a Broadcast Exchange Format (BXF) or another Extensible Markup Language (XML) based format to an SCTE 224 compliant format; and distributing, using the hardware processor, the enhanced programming content metadata to the plurality of EPG providers in real-time with respect to receiving the traffic data.

8. The method of claim 7, wherein the programming content stream comprises a linear television broadcast stream.

9. The method of claim 7, wherein the programming content stream comprises an Internet Protocol (IP) content stream.

10. The method of claim 7, wherein the programming content comprises live broadcast content.

11. The method of claim 7, wherein the supplemental metadata is obtained from a provider of the traffic data.

12. The method of claim 7, further comprising:

receiving, using the hardware processor, an update to the traffic data;

extracting, using the hardware processor, a programming content metadata included in the update, from the update;

obtaining, using the hardware processor, a supplemental metadata corresponding to the update;

enriching, using the hardware processor, the programming content metadata extracted from the update using the supplemental metadata corresponding to the update to produce an enhanced programming content metadata corresponding to the update;

conforming, using the hardware processor, the enhanced programming content metadata corresponding to the update to each of the plurality of formats corresponding respectively to the plurality of EPG providers; and distributing, using the hardware processor, the enhanced programming content metadata corresponding to the update to the plurality of EPG providers in real-time with respect to receiving the update.

13. A computer-readable non-transitory medium having stored thereon instructions, which when executed by a hardware processor, instantiate a method comprising:

receiving a traffic data for a programming content included in a programming content stream;

extracting a programming content metadata describing the programming content from the traffic data;

obtaining a supplemental metadata further describing the programming content;

enriching the programming content metadata using the supplemental metadata to produce an enhanced programming content metadata;

conforming the enhanced programming content metadata to each of a plurality of formats corresponding respectively to a plurality of electronic program guide (EPG) providers for the programming content stream, wherein the conforming is performed by translating the enhanced programming content metadata from a Broadcast Exchange Format (BXF) or another Extensible Markup Language (XML) based format to an SCTE 224 compliant format; and distributing the enhanced programming content metadata to the plurality of EPG providers in real-time with respect to receiving the traffic data.

14. The computer-readable non-transitory medium of claim 13, wherein the programming content stream comprises a linear television broadcast stream.

15. The computer-readable non-transitory medium of claim 13, wherein the programming content stream comprises an Internet Protocol (IP) content stream.

16. The computer-readable non-transitory medium of claim 13, wherein the programming content comprises live broadcast content.

17. The computer-readable non-transitory medium of claim 13, wherein the method further comprises:

receiving an update to the traffic data;

extracting a programming content metadata included in the update, from the update;

obtaining a supplemental metadata corresponding to the update;

enriching the programming content metadata extracted from the update using the supplemental metadata corresponding to the update to produce an enhanced programming content metadata corresponding to the update;

conforming the enhanced programming content metadata corresponding to the update to each of the plurality of formats corresponding respectively to the plurality of EPG providers; and distributing the enhanced programming content metadata corresponding to the update to the plurality of EPG providers in real-time with respect to receiving the update.

* * * * *